May 24, 1955
M. J. SCHULTZ
2,708,954
TIRE CHANGING STAND
Filed March 8, 1952
2 Sheets-Sheet 1
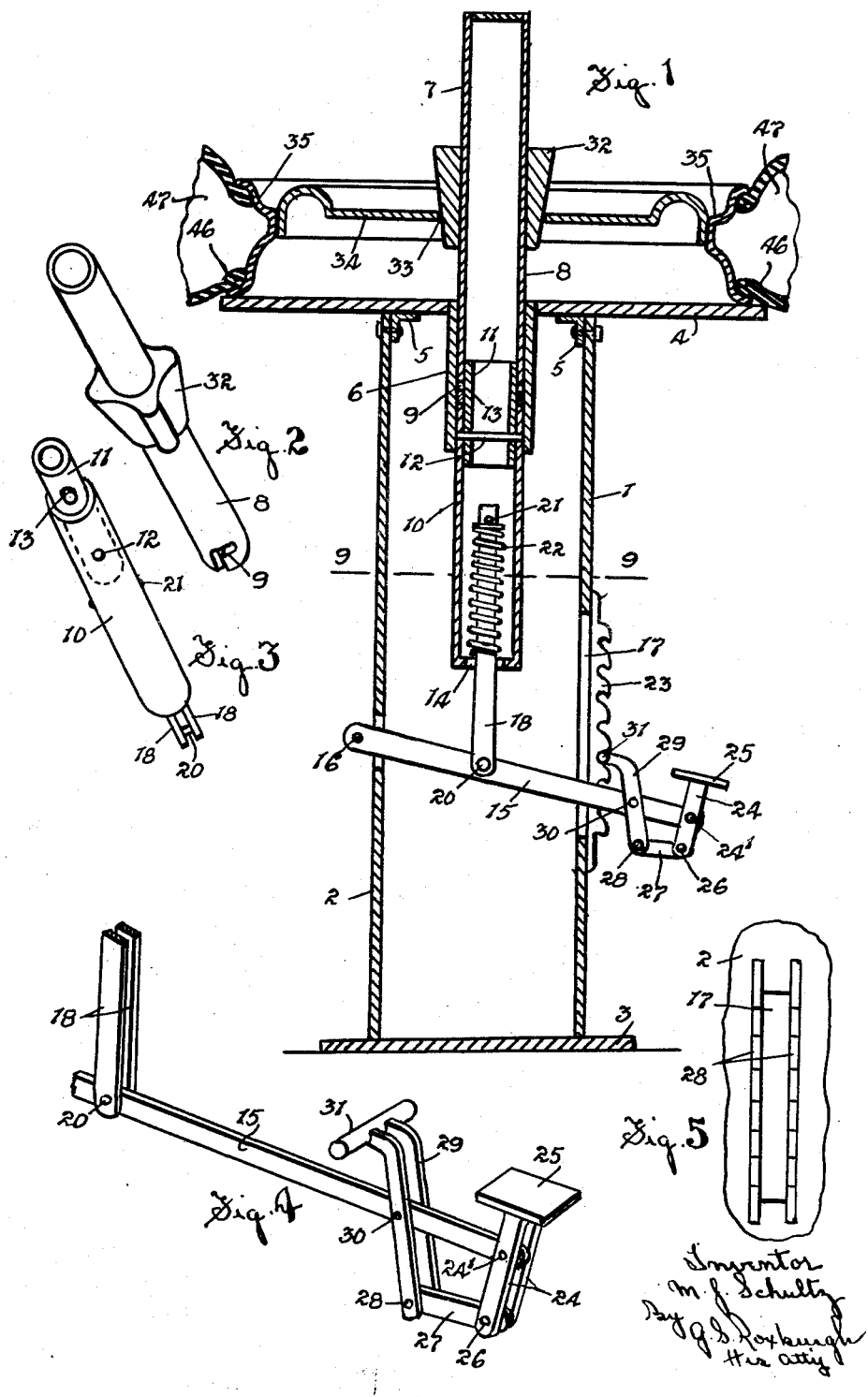
Inventor
M. J. Schultz
By Q. S. Roxburgh
His atty

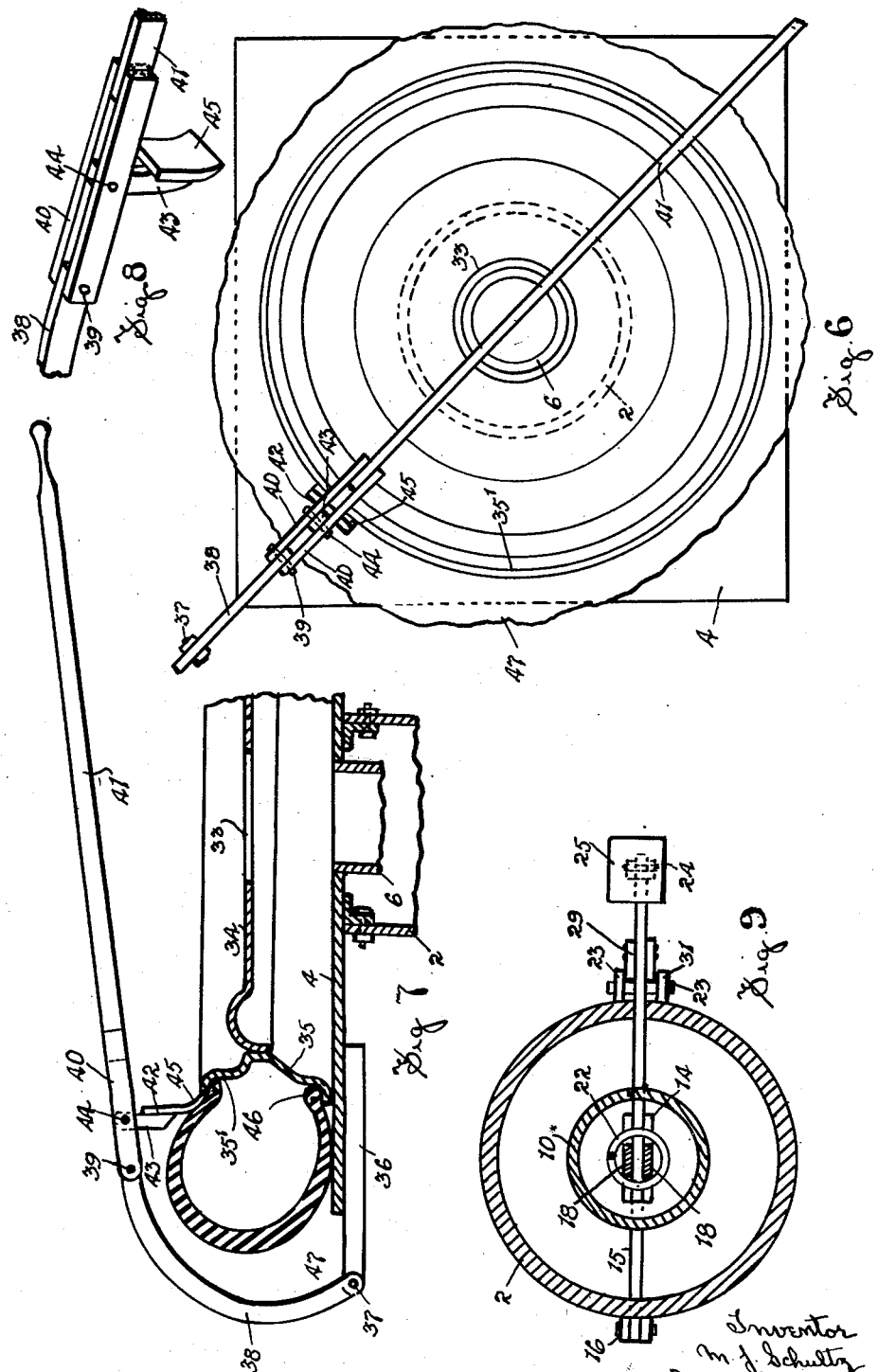

United States Patent Office 2,708,954
Patented May 24, 1955

2,708,954

TIRE CHANGING STAND

Matthew J. Schultz, Winkler, Manitoba, Canada, assignor to Steelman, Inc., Hallock, Minn.

Application March 8, 1952, Serial No. 275,649

4 Claims. (Cl. 144—288)

The invention relates to improvements in tire tools particularly for garage use, and an object of the invention is to provide a tire changing stand of simple and inexpensive construction which is neat in appearance, is simple to operate, will securely support the wheel in fixed position while work is being done upon the tire thereof and which is so constructed that it accommodate varying sized wheels.

A further object is to provide a stand having a suitable upstanding pedestal and a horizontally disposed wheel supporting work table and to supply means permitting of wheels of varying diameter to be easily, effectively and quickly releasably clamped to the table or released therefrom.

A further object is to provide a central pressure applying post formed from upper and lower parts or sections detachably connected together and vertically slidable, centrally, through the table and into the pedestal, the upper part being provided with a tapering wheel engaging plug and the lower part being associated with a foot pedal and pressure exerting spring.

A further object is to supply the pedal with a movable foot plate controlling a catch pin which latter can be moved in reverse directions by manipulating the plate and to provide opposing ratchet teeth on the pedestal engageable by the pin for pedal locking purposes.

A further object of the invention is to provide the table with a simple, cheap, durable and easily operated device for breaking the bead of the tire away from the wheel rim flange when the wheel is on the table, such device being designed that it will accommodate wheels of varying diameter and tires of varying size.

With the above more important objects in view the invention consists essentially in the parts hereinafter described, reference being had to the accompanying drawings, in which:

Fig. 1 is a vertical sectional view centrally through the tire tool, with certain parts appearing in side elevation and showing a wheel clamped to the table.

Fig. 2 is a perspective view of the upper part or section of the clamping post.

Fig. 3 is a perspective view of the lower part or section of the clamping post.

Fig. 4 is a perspective view showing the pedal, foot plate and other associated parts.

Fig. 5 is a face view showing the ratchet teeth bars at opposite sides of the intervening pedal receiving slot provided in the pedestal.

Fig. 6 is a plan view showing the work table with the upper part or section of the post removed, a wheel centered on the table and a device associated with the table for loosening or breaking the tire bead away from the retaining flange of the wheel rim.

Fig. 7 is a side elevation of part of the breaker device mentioned above and showing the pawl or dog thereof in position to force the bead inwardly upon its pivoted carrying lever being swung downwardly by an operator.

Fig. 8 is a perspective view of the dog or pawl and its associated, carrying parts.

Fig. 9 is an enlarged horizontal cross-sectional view at 9—9 Fig. 1.

In the drawings like characters of reference indicate corresponding parts in the several figures.

In carrying out my invention I provide a stand 1 of convenient height for an attending operator and which stand presents a tubular body or pedestal 2 mounted on a base plate 3 and a substantially square, metallic, upper plate or work table 4 which is secured to the pedestal by suitable angle brackets 5 welded to the underside of the plate and bolted to the pedestal. The plate 4 has a central opening therein in which is welded, flush with the table, the upper end of a downwardly extending guide sleeve 6 positioned concentric to the tubular body 2. The base plate can be bolted or otherwise secured to a support such as a floor.

The sleeve receives slidably, a two part post 7, both parts being tubular. The upper part or section 8 has similar opposing bayonet slots 9 formed therein adjacent the lower end thereof and the lower part or section 10 has an upwardly extending inner sleeve 11 fixedly secured thereto by a cross pin 12 and the projecting end of the sleeve is supplied with exterior, diametrically opposing pins 13 adapted to be received in the bayonet slots with the purpose of detachably securing said upper and lower post sections together. The lower end of the section 10 is closed and is provided with an outlet slot 14 for a purpose shortly appearing.

In a location underlying the lower end of the post and passing diametrically across and through the pedestal, I have provided a foot pedal or lever 15 which has one end pivotally secured to the pedestal at 16 and the other end passing through a vertical slot 17 supplied in the pedestal. Within the pedestal, the pedal has a pair of similar upgoing bars 18 pivotally secured thereto at 20 and the bars extend freely through the slot 14 and have their upper ends connected by a pivot pin 21. A coil pressure spring 22 surrounds the bars and has one end stopped by the projected ends of the pin and the other end engaging the closed end of the section 10.

At opposite sides of the slot 17 and to the pedestal, I secure permanently a pair of similar upstanding bars 23 each of which is supplied with ratchet teeth as shown.

The free end of the pedal, which extends beyond the pedestal, has a pair of upstanding, relatively short levers 24 pivotally secured thereto at 24' and the upper ends of the levers have a foot plate 25 welded thereto. The lower ends of the levers span and are pivotally connected by a pivot pin 26 to a relatively short ingoing link 27 and the link is also pivotally connected by a pin 28 to a pair of upgoing side arms 29 which are also pivotally connected, more or less centrally of their length, by a pin 30 to the intervening pedal. The upper ends of the arms are incurved towards the pedestal and have a horizontally disposed catch pin 31 welded thereto, which pin is engageable with opposing ratchet teeth of the bars 23.

The upper part or section 8 of the post has a tapering plug 32 permanently secured thereto and when the various parts are in working position, the plug centrally overlies the table.

When it is desired to clamp a wheel, with tire, to the plate 4 the upper part of the post is disjointed from the lower part and temporary laid aside. The wheel with tire, is then placed centrally on the table and at such time the existing central hole 33 in the disc 34 of the wheel centrally overlies the upper end of the sleeve 6 and the existing rim 35 of the wheel rests on the upper face of the table. With the wheel so positioned, one then replaces the upper post section and turns it to a position where the pins 13 can re-enter the bayonet slots 9 and become releasably locked therein, and at such time the tapering plug 32 is in an elevated position centrally above the opening 33 in the disc 34 of the wheel. The attendant or operator then presses down on the foot plate and the down going pedal compresses the spring and causes the connected post sections to lower with the result that the plug descends and enters the opening 33 and effectively clamps the wheel to the table. It will be noted that once the plug has engaged the opening 33, the continued downpressing of the pedal increases the compression of the spring and in so doing more firmly seats the plug in the said opening 33. In the finally compressed condition of the spring, the catch pin is allowed to engage with a lower pair of teeth as will be readily understood.

In connection with the foot plate 25 it will be noticed that a downward and outward pressure applied on it, moves the pin 31 in a direction away from the ratchet teeth and that a downward and inward pressure moves said pin towards and into engagement with the ratchet teeth. This provides a very convenient arrangement for the attendant.

It is most desirable that a tire tool of this type be provided with what might be termed a bead breaker and to this end I supply the following parts.

To one corner of the table 4 I permanently secure a horizontally disposed bar 36 which has its inner end welded to the underside of the table. To the extending end of the bar I pivotally secure, by a pin 37, the lower end of a curved upstanding rocker arm 38 which has its upper incurving end connected by a pivot pin 39 to a pair of side arms 40 carried by a pressure applying lever 41, the lever being entered between and securely welded to the inner ends of the side arms. A down hanging pivoted dog or pawl 42 is carried by the side arms and is in the form of a shank 43 pivoted at 44 to the side arms and with the shank permanently welded centrally to the rear of a transverse plate 45 the lower end of which is curved inwardly.

When the bead 46 of a tire 47 is to be released or broken away from the rim of the wheel, the wheel is placed centrally on the work table after the lever 41 has been swung clear, it being understood that at such time the upper section of the post has been removed. With the wheel so placed the lever is end shifted to position the incurved lower end of the dog 42 immediately to the outer side of the then upper bead retaining flange 35' of the rim. The operator then presses downwardly on the free end of the lever and such pressure forces the dog inwardly to break the bead away from the rim flange. It will be observed that the curve and positioning of the rocker arm is such that it will clear the various sizes of tires and due to the particular linkage of the lever to the work table 4, which permits an endwise shift of said lever, the position of the bead breaking dog can be radially adjusted for wheels of varying diameters.

What I claim as my invention is:

1. In a tire tool, in combination, a stand embodying an upstanding pedestal and a flat lying plate secured to the upper end thereof, a down going sleeve centrally within the pedestal and having its upper end opening through the plate and permanently secured thereto, a two part tubular post passing slidably through the sleeve and with the said parts readily disjointable to permit of the removal of the upper part, a tapering plug secured to the upper part of the post, a foot pedal underlying the lower end of the post and crossing the pedestal, a pressure applying bar pivotally secured to the pedal, passing freely through a slot in the lower end of the tubular post and having its upper end provided with a cross pin, a compression spring surrounding the bar between the pin and the lower end of the post and a foot plate, exterior of the pedestal, for actuating the pedal.

2. The device as claimed in claim 1 wherein means is provided for retaining the pedal in desired depressed positions.

3. The device as claimed in claim 1 wherein one end of the pedal is pivotally secured to the pedestal and the other end extends through a vertical slot provided in the pedestal, the pedestal is supplied with ratchet teeth at opposite sides of the slot, the pedal pivotally carries a catch pin engageable with the ratchet teeth, the foot plate is pivotally carried by the pedal and means is provided for moving the pin towards or away from the teeth in a pivotal movement of the foot plate.

4. A two part tubular post for use in tire tools having the parts disjointably connected together to permit of the ready removal of the upper part, a pressure applying bar passing upwardly through a slot in the lower end of the tubular post and supplied at its upper end with a cross pin, a compression spring surrounding the bar between the pin and the slotted lower end of the post, and a tapering plug secured to the upper end of the post.

References Cited in the file of this patent

UNITED STATES PATENTS

| | | |
|---|---|---|
| 1,591,193 | Weaver | July 6, 1926 |
| 1,793,864 | Manley | Feb. 24, 1931 |
| 2,000,036 | Renfro | May 7, 1935 |
| 2,057,200 | McCarthy | Oct. 13, 1936 |
| 2,081,402 | Krema | May 25, 1937 |
| 2,314,127 | Colley et al. | Mar. 16, 1943 |
| 2,505,172 | Coats | Apr. 25, 1950 |
| 2,512,864 | Koester | June 27, 1950 |
| 2,523,979 | Weeks et al. | Sept. 26, 1950 |
| 2,573,233 | Verdick et al. | Oct. 30, 1951 |
| 2,598,946 | Teegarden | June 3, 1952 |